United States Patent [19]

Sakata et al.

[11] 4,389,786
[45] Jun. 28, 1983

[54] CONTOUR MEASURING INSTRUMENT

[75] Inventors: Hideo Sakata, Oomiya; Seigo Takahashi, Machida, both of Japan

[73] Assignee: Mitutoyo Mfg. Co., Ltd., Tokyo, Japan

[21] Appl. No.: 250,484

[22] Filed: Apr. 2, 1981

[30] Foreign Application Priority Data

Apr. 18, 1980 [JP] Japan ................................. 55-52098

[51] Int. Cl.³ .............................................. G01B 7/28
[52] U.S. Cl. ................................. 33/174 P; 33/174 L
[58] Field of Search ............ 33/174 P, 174 L, 174 R, 33/172 E, 178 E, 169 R

[56] References Cited

U.S. PATENT DOCUMENTS 3,962,792  6/1976  Stepanek ........................ 33/178 E X
4,074,438  2/1978  Takeda .............................. 33/174 P
4,231,158 11/1980  Possati ........................... 33/178 E X
4,265,022  5/1981  Noguchi et al. ................... 33/174 P Primary Examiner—Harry N. Haroian
Attorney, Agent, or Firm—Flynn, Thiel, Boutell & Tanis

[57] ABSTRACT

An instrument for measuring the shape of the outer surface, i.e., the contour of a workpiece. In this contour measuring instrument, the tip of a stylus fixed on one end of a rotatable arm is brought into contact with the outer surface of the workpiece, the arm in this condition is moved in the axial direction thereof, and the vertical movement of the stylus tracing the irregularities on the outer surface of the workpiece is detected by a differential transformer so as to measure the contour of the workpiece. In this contour measuring instrument, there are provided a driving mechanism for forcing the arm to turn in a predetermined direction and an arm turning angle detecting mechanism for detecting the turning of the arm by the driving mechanism beyond a predetermined angle to stop the driving mechanism in operation, whereby the detection angle detected by the arm turning angle detecting mechanism is set at a predetermined angle, so that the arm can be inserted into an object to be measured, being of a cylindrical shape, or a hole and the like of the object.

13 Claims, 7 Drawing Figures

CONTOUR MEASURING INSTRUMENT

BACKGROUND OF THE INVENTION

1. Field of the Invention

This invention relates to contour measuring instruments, and particularly to a contour measuring instrument of the type which takes measurement of the outer surface, i.e., the contour of an object to be measured in a predetermined cross section by tracing the outer surfaces of the object to be measured with a stylus secured to one end of a rotatable arm.

2. Description of the Prior Art

In general, in a contour measuring instrument, a stylus to be brought into contact with the outer surface of an object to be measured is secured to one end of an arm, the other end portion of this arm is rotatably supported by an arm support member, and the center of gravity of the arm is located so that the end that supports the stylus is slightly heavier, whereby the stylus constantly rests in abutting contact with the outer surface of the object to be measured. In measuring the contour of the outer surface of the object by use of a contour measuring instrument of this type, the arm support member is moved in the axial direction of the arm, the stylus is displaced in accordance with the contour of the outer surface of the object to be measured due to the movement of this arm support member so as to turn the arm about its fulcrum where the arm is pivoted, the rotation of the arm is detected by use of contour signal detecting means such as a differential transformer, and the signal detected by this contour signal detecting means is combined with a signal corresponding to the feeding of the arm support member, to carry out the measurement of the contour of the object.

With the conventional contour measuring instrument of the type described, when the measurement is initiated or completed the arm is forced to rotate by a driving mechanism so that the stylus secured to one end of the arm can be comparatively greatly separated from the measured surface of the object to be measured.

However, when measurement is taken on the inner diameter of a cylindrical object or of a hole formed in an object, if the arm is indiscriminately turned to a great degree as described above, there occurs the disadvantage that the stylus or the forward end of the arm comes into abutting contact with the inner wall or the like of the object to be measured.

SUMMARY OF THE INVENTION

An object of the present invention is to provide a contour measuring instrument in which the amount of forced turning of an stylus supporting arm can be controlled in accordance with the contour of an object to be measured.

Another object of the present invention is to provide a contour measuring instrument having a mechanism capable of controlling the amount of forced turning of the arm which mechanism has a reliable and simplified construction.

A further object of the present invention is to provide a contour measuring instrument capable of preventing the amount of turning of the arm from exceeding a predetermined amount thereby to prevent damage to the arm, stylus and the like.

A still further object of the present invention is to provide a contour measuring instrument having an improved driving mechanism for turning the arm.

The present invention is of such an arrangement that an arm turning angle detecting mechanism is provided for detecting the turning of the arm which is being forced to turn by a driving mechanism, beyond a predetermined angle and a detection signal for detecting the turning of the arm beyond the predetermined angle by the aforesaid detecting mechanism is adapted to stop operation of the driving mechanism to prevent the arm from further turning, thereby achieving the abovedescribed object.

The preferred embodiment of the arm turning angle detecting mechanism according to the present invention is of such an arrangement that detecting elements opposed to the arm and capable of abutting against the arm are secured to a sliding member which is slidable on the main body of the instrument, the sliding member is held in place at all times by biasing means, a detection switch is provided which is actuated when the sliding member is moved beyond a predetermined value through the detecting element during turning of the arm, and the driving mechanism is stopped in operation when the detection switch is actuated.

The present invention contemplates to provide a contour measuring instrument wherein, in addition to a detection switch actuated by the sliding member for stopping the driving mechanism for turning the arm, a warning detection switch also actuated by the sliding member is provided, and this warning detection switch is actuated to provide an alarm when the sliding member is actuated to a degree greater than the actuation of the aforesaid detection switch for stopping operation of the driving mechanism, thereby preventing damage of the arm, stylus and the like.

The preferred embodiment of the driving mechanism for turning the arm according to the present invention is of such an arrangement that a pair of working pins are fixed on a rotatable disc secured to an output shaft of a motor and spaced a predetermined distance apart from each other, a letter 'L' shaped pin fixed on the arm is actuated by the working pins, and a switch is provided which is actuated at a position where the letter 'L' shaped pin is disposed between the both working pins in a condition that the rotatable disc is in a predetermined position, such for example as the arm is in a horizontal position.

DETAILED DESCRIPTION OF THE PREFERRED EMBODIMENT

Description will hereunder be given of one preferred embodiment of the present invention with reference to the drawings.

Figure 1:
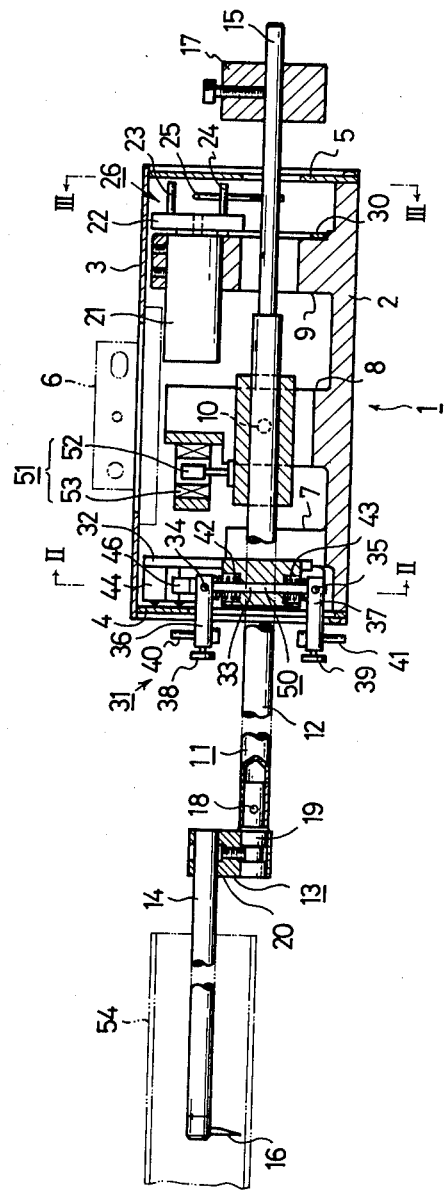
FIG. 1 is a sectional view showing an embodiment of the contour measuring instrument according to the present invention.

In FIG. 1, the main body 1 of the instrument comprises a base 2, a cover 3 mounted on the base 2 and defining an enclosure above the base, and front and back covers 4 and 5 for closing the forward and rear ends of this cover 3. This main body 1 of the instrument is connected to a feeding mechanism, not shown, through a connecting member 6 secured to the upper portion of the cover 3, and adapted to be moved to the right and left in FIG. 1.

Three support walls 7, 8 and 9 are integral with and extend upwardly from the base 2 in the inside the enclosure defined by the cover 3 of the main body 1 of the instrument. The central support wall 8 is formed at the center thereof with a letter 'U' shaped cut-away portion, within which is pivotably supported an arm 11 by means of a fulcrum shaft 10. This arm 11 is comprised of a main body 12 of a hollow tubular shape and supported by the fulcrum shaft 10, a forward end arm 14 connected to one end of the main body 12 of the arm through a coupling 13 so that said forward end arm portion extends in parallel with the main body 12 of the arm and is transversely offset therefrom a predetermined distance and a weight supporting arm 15 connected to the other end of the main body 12 of the arm. One end portion of the main body 12 of the arm (the left end portion in FIG. 1) extends through the front cover 4 of the main body 1 of the instrument and the forward end portion of the weight supporting arm 15 (the right end in FIG. 1) extends through the back cover 5, respectively, and further extend outwardly. Formed at portions of the front and back covers 4 and 5, through which the main body 12 of the arm and the weight supporting arm 15 extend, are through-holes sufficient for accommodating the pivotal movement of the arm 11.

A stylus 16 is secured to one end portion of the arm 11, i.e., the forward end of the forward end arm 14, which stylus extends downwardly. A balance weight 17 is fixed on the other end portion of the arm 11, i.e., the weight supporting arm 15, so that the position of the balance weight is adjustable.

The coupling 13 comprises a shaft member 19 having one end thereof projecting into and supported for rotation in the main body 12 of the arm. A pin 18 locks the shaft member 19 against rotation and dislodgement. A connecting member 20 is fixed to the other end of this shaft member 19 and supports the forward end arm 14. When the pin 18 is removed, the coupling 13 allows the connecting member 20 to rotate through 180°, so that the stylus 16 can be directed upwardly.

Furthermore, the transverse offset between the axis of the main body 12 of the arm and the axis of the forward end arm 14 through the connecting member 20 is determined such that the tip of the stylus 16 is aligned with the axis of the main body 12 of the arm.

Figure 3:
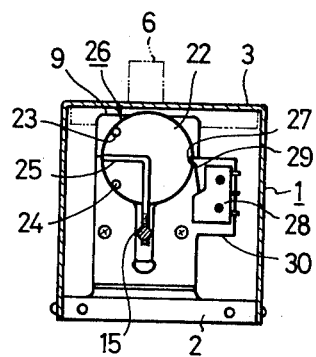

A motor 21 is supported on the support wall 9 of the base 2 as shown in the right portion in FIG. 1, and a rotary disc 22 is secured to an output shaft of the motor 21. A pair of working pins 23 and 24 are secured to and project from the outer end face of the rotary disc 22. The working pins 23 and 24 are spaced a predetermined distance apart from each other. A letter 'L' shaped pin 25 is fixed on the weight supporting arm 15 and the horizontal leg thereof projects between the pins 23 and 24. Thus, a driving mechanism 26 for forcing the arm 11 to turn in a predetermined direction is defined by the motor 21, rotary disc 22, working pins 23, 24 and letter 'L' shaped pin 25. Additionally, a V-groove 27 is formed on the circumferential surface of the rotary disc 22 (Refer to FIG. 3.), and the V-groove 27 is engageable with the outward end of an armature 29 of a microswitch (limit switch) 28. When the forward end of the armature 29 is engaged with the V-groove 27 as shown in FIG. 3, the rotary disc 22 is in non-rotatable position, whereby the working pins 23 and 24 are in vertically symmetrical positions on opposite sides of a horizontal plane passing through the axis of the output shaft of the motor 21. Further, the microswitch 28 is secured to the support wall 9 through a mounting plate 30.

Figure 2:
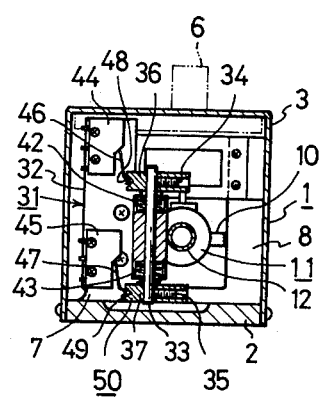
FIGS. 2 and 3 are sectional views taken along the lines II—II and III—III in FIG. 1, respectively.
Figure 4:
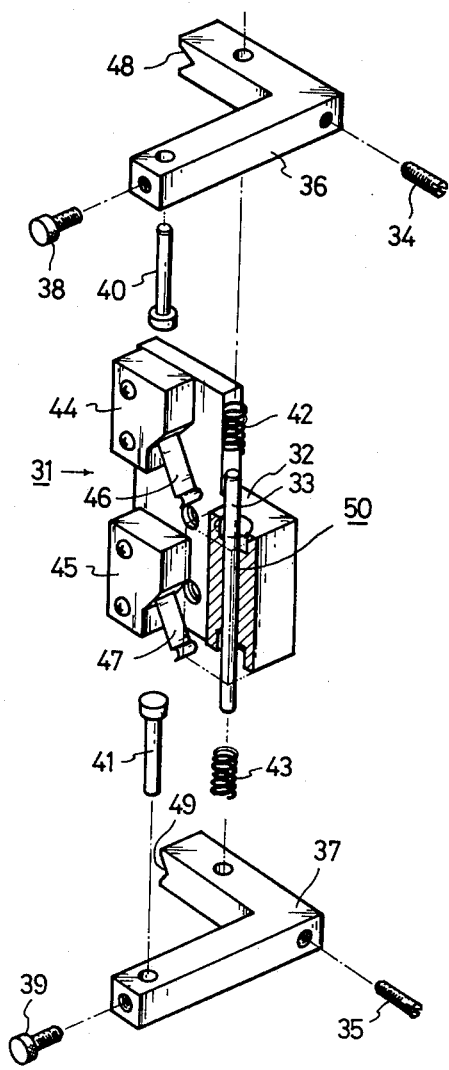
FIG. 4 is a disassembled perspective view, partly cut away, showing the essential portions in FIG. 1.

Secured to the support wall 7 at the left end in FIG. 1 is an arm turning angle detecting mechanism 31 which is capable of detecting the turning of the arm 11 beyond a predetermined angle. Caused by the driving mechanism 26. As shown in detail in the sectional view in FIG. 2 and the disassembled perspective view in FIG. 4, this detecting mechanism 31 comprises a mounting base plate 32 connected to the support wall 7 through screws; a sliding shaft 33 slidably supported by the mounting base plate 32; upper and lower letter 'L' shaped members 36, 37 fixed through screws 34, 35 to the upper and lower ends of the sliding shaft 33 that project from the mounting base plate 32; detecting elements 40, 41 secured to the letter 'L' shaped members 36, 37 through mounting screws 38, 39 in such a manner as to be adjustable in their mounting positions, said detecting elements being opposed to the arm 11 at positions above and below of the arm 11, respectively, and capable of abutting against the arm 11; compression coil springs 42, 43 confined between the upper and lower letter 'L' shaped members 36, 37 and the mounting base plate 32 and encircling the sliding shaft 33 so as to maintain the letter 'L' shaped members 36, 37 in place; and upper and lower microswitches (limit switches) 44, 45 functioning as detection switches secured to the mounting base plate 32. The armatures 46, 47 of these microswitches (limit switches) 44, 45 are engaged with V-grooves 48, 49 formed on the end faces of the aforesaid letter 'L' shaped members 36, 37, respectively. In this case, the V-groove 49 formed on the lower letter 'L' shaped member 37 is shallow, so that even a slight movement of the letter 'L' shaped member 37 can actuate the armature 47. The V-groove 48 formed on the upper letter 'L' shaped member 36 is deep and large, so that only a comparatively large movement of the letter 'L' shaped member 36 can actuate the armature 46. Furthermore, the upper microswitch 44 serving as a warning detection switch is connected to a warning buzzer or a warning lamp, not shown, and is adapted to sound the warning buzzer or turn on a warning lamp when the armature 46 is actuated. The lower microswitch 45 serving as a detection switch for stopping the operation of the driving mechanism 26 is connected to a power source circuit of the motor 21 of the driving mechanism 26, and is adapted to stop operation of the motor 21 when the working piece 47 is actuated. Further, the sliding shaft 33 and the upper and lower letter 'L' shaped members 36, 37 collectively constitute a sliding member 50.

A differential transformer 51 is provided as an arm rotation value detecting means for detecting the rotational movement of the arm 11. The differential transformer 51 is located between the main body 12 of the arm 11 and the central support wall 8, and comprises a core 52 secured to the main body 12 of the arm, and a coil 53 secured to the support wall 8.

In addition, in FIG. 1, designated at 54 is an object to be measured such as a cylindrical member having a bore therethrough, against which the stylus 16 abuts.

Figure 5:
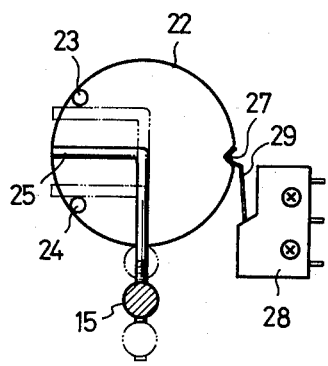
FIGS. 5 through 7 are views illustrating the driving mechanism for the arm according to the present invention in active positions.
Figure 6:
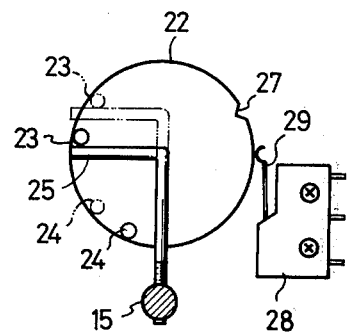
Figure 7:
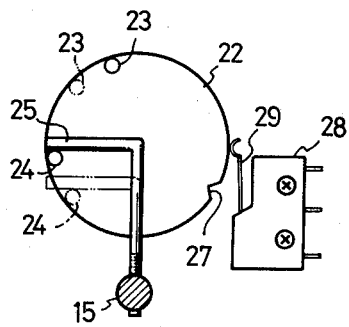

Description will now be given of operation of this embodiment with reference to FIGS. 5 through 7 illustrating the driving mechanism in active positions, in addition to FIGS. 1 through 4.

In initiating the measurement, in order to dispose the stylus 16 secured to one end of the arm 11 within the inner diameter of an object 54 to be measured, which is of a cylindrical shape, firstly the motor 21 of the driving mechanism 26 is driven to rotate the rotary disc 22 in a predetermined direction. In this case, the rotating direction of the rotary disc 22 is determined depending on the orientation of the stylus 16. Unless the arm 11 is forced to turn in the reverse direction against the turning force of the arm 11 covered by gravity, the stylus 16 abuts against the object 54 to be measured, because the balance weight 17 is adjusted so that the arm 11 can turn by gravity in the direction, toward which the stylus 16 faces, at all times. More specifically, when the stylus 16 is directed downwardly as shown in FIG. 1, the arm 11 tends to turn about the fulcrum shaft 10 in the counterclockwise direction. Consequently, as shown in FIG. 6, the rotary disc 22 is turned in the counterclockwise direction to cause the upper working pin 23 to push the letter 'L' shaped pin 25 down, whereby the portion of the arm 11 on the side of the weight supporting arm 15 is lowered to turn the arm 11 in the clockwise direction, so that the stylus 16 can be raised. On the other hand, when the forward end arm 14 is inverted on the center of the shaft member 19 of the coupling 13 and the stylus 16 is directed upwardly, the arm 11 tends to turn in the clockwise direction in FIG. 1. Consequently, as shown in FIG. 7, the rotary disc 22 is turned in the clockwise direction to cause the lower working pin 24 to push the letter 'L' shaped pin 25 up, whereby the weight supporting arm 15 of the arm 11 is raised to turn the arm 11 in the counterclockwise direction, so that the stylus 16 can be lowered. In either case, the stylus 16 is caused to be separated from the measured surface of the object 54 to be measured.

Now, during the forced turning of the arm 11 by this driving mechanism 26, if the arm 11 abuts against either the upper detecting element 40 or the lower detecting element 41 of the arm turning angle detecting mechanism 31 (to simplify description to be made hereunder, description will now be given of the case the stylus 16 is directed downwardly as shown in FIG. 1, and consequently, the arm 11 is turned in the clockwise direction through the action of the working pin 23, and the arm 11 abuts against the upper detecting element 40), then the upper letter 'L' shaped member 36, to which this detecting element 40 is secured together with, the sliding shaft 33 fixed to this letter 'L' shaped member 36 and the lower letter 'L' shaped member 37 tend to integrally move upwardly against the biasing force of the lower compression coil spring 43. In addition, a slight movement of the sliding member 50 including the upper and lower letter 'L' shaped members 36, 37 and the sliding shaft 33 actuates the armature 47 of the lower microswitch 45 through the action of the V-groove 49, whereby the motor 21 is instantly stopped in operation, so that the arm 11 can be prevented from further clockwise turning. In this case, the position of the detecting element 40 is predetermined taking into consideration the inner diameter and the like of the object 54 to be measured, and consequently, the height of the end of the arm 11 on the side of the stylus 16 is determined such that the end of the arm 11 does not abut against either the upper or the lower surface of the inner wall of the object 54 to be measured.

When the arm 11 is turned through a predetermined angle as described above, the feeding mechanism, not shown, is operated to insert the forward end of the arm 11 into the object 54 to be measured. When the arm 11 is inserted to a predetermined position operation of, the feeding mechanism is stopped, then, the motor 21 of the driving mechanism 26 is driven in a direction opposite the previous direction of the forced turning of the arm 11, the arm 11 turns, by gravity, in a direction to lower the stylus 16, and turning of the arm 11 is stopped at a position where the stylus 16 abuts against the inner wall surface of the bore of the object 54 to be measured. Operation of the motor 21 is stopped through the action of the microswitch 28 at a position where the working piece 29 of the microswitch 28 is engaged with the V-groove 27 of the rotary disc 22. By this, the letter 'L' shaped pin 25 fixed to the weight supporting arm 15 of the arm 11 is stopped in operation simultaneously with the stopping of the arm 11. On the other hand, the upper and lower working pins 23, 24 are rotated in unison with the rotary disc 22 and are stopped simultaneously with the stopping of the motor 21, and hence, the relationship between the upper and lower working pins 23, 24 and the letter 'L' shaped pin 25 becomes as indicated by solid lines in FIG. 5. Because of this, the letter 'L' shaped pin 25 is movable within the range in which it does not abut against the upper and lower working pins 23, 24, so that the arm 11 can be turned within the range in which the letter 'L' shaped pin 25 is movable.

When the stylus 16 abuts against the inner wall surface of the object 54 to be measured and the arm 11 becomes rotatable as described above, the feeding mechanism, not shown, is operated in a direction opposite the aforesaid direction, whereby the main body 1 of the instrument is moved to the right in FIG. 1. Along with this movement of the main body 1 of the instrument, the stylus 16 is fed to the right, tracing the irregularities of the inner wall surface of the object 54 to be measured and moving up and down, and this vertical movement of the stylus 16 is detected by the differential transformer 51 as the pivotal movement of the arm 11. The data detected by the differential transformer 51 is combined with the feeding data of the feeding mechanism, whereby the contour of the object 54 to be measured is indicated on an X-Y recorder or the like.

When the arm 11 is raised and the forward end portion of the arm 11 is withdrawn from within the object 54 to be measured upon completion of the measurement, the arm 11 is raised by a predetermined value in the same manner as aforesaid, so that the arm 11 can be withdrawn without abutting against the upper wall of the bore and the like of the object 54 to be measured.

Furthermore, for example, when the main body 1 of the instrument is manually handled during the initial setting of the main body 1 of the instrument, if the arm 11 is turned beyond a predetermined value, then the arm 11 abuts against either the detecting element 40 or 41 of the arm turning angle detecting mechanism 31 to displace the sliding member 50 to a great degree, whereby the armature 46 of the upper microswitch 44 is actuated by the V-groove 48 of the upper letter 'L' shaped member 36, so that the warning buzzer or the warning lamp can be actuated to provide an alarm.

In addition, as for action in the case the stylus 16 is directed upwardly, only the directions are different from those in the foregoing description, so that detailed description will be omitted.

While the embodiment as described above, the angle of the forced turning of the arm 11 caused by the driving mechanism 26 is adapted to be controlled by the arm turning angle detecting mechanism 31, so that the portion of the stylus 16 of the arm 11 can be smoothly inserted into the hole and the like of the object 54 to be measured. Furthermore, the arm turning angle detecting mechanism 31 is composed by a combination of mechanical parts, so that the operation can be reliably performed without requiring any energy during normal condition. Further, the sliding member 50 is formed to be symmetrical in the vertical direction, so that the measurement in either the upward or downward direction, in which the stylus is directed, can be equally performed.

In addition, in working of the present invention, the method of detecting the turning angle of the arm 11 is not limited to the mechanical one, in which the detecting elements 40, 41 abut against the arm 11, but, the movement of the arm 11 may be directly detected by means of optical switches, magnetic switches or the like.

Furthermore, as the detection switches, optical switches or reed switches may be used in place of the microswitches 44, 45, with the mechanical arrangement of the arm turning angle detecting mechanism 31 being used as aforesaid. Further, the arrangement of the driving mechanism 26 is not limited to that in the abovedescribed embodiment, but other arrangements may be used.

What is claimed is:

1. In a contour measuring instrument for measuring the contour of a surface of a workpiece, the combination comprising: an instrument body; an elongated arm supported on said body for pivotal movement about a pivot axis which extends transverse to said arm so that said arm can pivot in clockwise and counterclockwise directions; a stylus attached to one end of said arm and adapted to contact the surface of the workpiece and to be traversed thereacross to trace the contour of that surface; weight means on said arm for balancing said arm; an arm rotation value detecting means coupled to said arm for detecting the extent of pivotal movement of said arm caused by displacement of said stylus as said stylus is traversed across the surface of the workpiece; a drive mechanism for forcibly pivoting said arm about said axis in a direction to move said stylus away from the surface of the workpiece; and an arm turning angle detecting mechanism responsive to forcible pivoting of said arm by said drive mechanism through a predetermined angle and coupled to said drive mechanism to stop operation of said drive mechanism whereby to prevent said arm from pivoting through an angle larger than said predetermined angle and thereby prevent said stylus from moving farther away from the surface of the workpiece.

2. A contour measuring instrument according to claim 1, in which said arm turning angle detecting mechanism comprises a slidable member mounted on said instrument body for sliding movement in a direction transverse to said arm and extending at a right angle to the pivot axis of said arm; at least one detecting element secured to said slidable member and being disposed in opposed relationship to said arm so that it can abut against said arm; biasing means for normally holding said slidable member in a selected position in which said detecting element is spaced from said arm; and a first detecting switch adapted to be actuated when said arm is forcibly pivoted by said drive mechanism and said arm abuts against said detecting element and said slidable member is thereby slid in said direction against the urging of said biasing means, said detecting switch being coupled to said drive mechanism so that actuation of said detecting switch stops operation of said driving mechanism.

3. A contour measuring instrument according to claim 2, in which said arm turning angle detecting mechanism includes two of said detecting elements which are fixed to said slidable member on opposite sides of said arm.

4. A contour measuring instrument according to claim 2, in which said detecting element is adjustably secured to said slidable member so that its position with respect to said arm can be adjusted.

5. A contour measuring instrument according to claim 3, in which said detecting elements are adjustably secured to said slidable member so that their positions with respect to said arm can be adjusted.

6. A contour measuring instrument according to claim 3, in which said arm turning angle detecting mechanism is provided with a second detection switch, said second detection switch being actuated when said slidable member is slid in said direction a distance greater than the distance that causes actuation of said first detection switch, and warning means operable in response to actuation of said second detection switch.

7. A contour measuring instrument according to claim 4, in which said arm turning angle detecting mechanism is provided with a second detection switch, said second detection switch being actuated when said slidable member is slid in said direction a distance greater than the distance that causes actuation of said first detection switch, and warning means operable in response to actuation of said second detection switch.

8. A contour measuring instrument according to claim 5, in which said arm turning angle detecting mechanism is provided with a second detection switch, said second detection switch being actuated when said slidable member is slid in said direction a distance greater than the distance that causes actuation of said first detection switch, and warning means operable in response to actuation of said second detection switch.

9. A contour measuring instrument according to claim 1, in which said drive mechanism comprises: a motor; a rotary disc secured to an output shaft of said motor; a pair of working pins fixed to said rotary disc in circumferentially spaced-apart relationship; an L-shaped pin, one leg of which is disposed between said working pins and the other leg of which is fixed to said arm; and a switch adapted to be actuated when said rotary disc is positioned at a predetermined position.

10. A contour measuring instrument according to claim 2, in which said drive mechanism comprises: a motor; a rotary disc secured to an output shaft of said motor; a pair of working pins fixed to said rotary disc in circumferentially spaced-apart relationship; an L-shaped pin, one leg of which is disposed between said working pins and the other leg of which is fixed to said arm; and a switch adapted to be actuated when said rotary disc is positioned at a predetermined position.

11. A contour measuring instrument according to claim 2, wherein said drive mechanism and said arm turning angle detecting mechanism are disposed on opposite longitudinal sides of the pivot axis of said arm.

12. A contour measuring instrument according to claim 1, in which said arm comprises an elongated main arm section supported for pivotal movement about said pivot axis and an elongated front arm section, said stylus being mounted on said front arm section, the longitudinal axis of said front arm section being parallel with and laterally offset from the longitudinal axis of said main arm section, a coupling connecting the adjacent ends of said main arm section and said front arm section so that said front arm section can be pivoted through an angle of 180° relative to said main arm section to change the orientation of said stylus and to maintain the tip of said stylus coaxial with the longitudinal axis of said main arm section, and said weight means comprises a balance weight mounted adjacent the other end of said arm, said balance weight being adjustable in position in a direction lengthwise of said arm.

13. A contour measuring instrument for measuring the contour of a surface of a workpiece, comprising: an instrument body adapted to be moved horizontally in a direction toward and away from the surface of the workpiece; an elongated substantially horizontal arm; a horizontal fulcrum on said instrument body and supporting said arm for pivotal movement about a horizontal pivot axis that extends transverse to the longitudinal axis of said arm so that said arm can move clockwise and counterclockwise in a vertical plane, said pivot axis being spaced from the front and rear ends of said arm; a vertical stylus attached to the front end of said arm and adapted to contact the surface of the workpiece and to be traversed thereacross to trace the contour of that surface; a balance weight mounted on the rear end of said arm and balancing said arm so that said stylus is normally urged by gravity into contact with the surface of the workpiece; a differential transformer comprising a core attached to the arm at a location which is spaced frontwardly from said pivot axis and a coil mounted on said instrument body, said differential transformer being capable of detecting pivotal movement of said arm about said pivot axis caused by vertical displacement of said stylus as said stylus is traversed across the surface of said workpiece; an L-shaped pin located rearwardly of said pivot axis, said L-shaped pin having a vertical leg secured to said arm and a horizontal leg; a motor having an output shaft; a rotary disc attached to said output shaft; a pair of working pins projecting horizontally from said disc and being circumferentially spaced from each other, said horizontal leg projecting between said working pins and being alternatively engageable thereby so that rotation of said disc by said motor in one direction or the other will forcibly pivot said arm about said pivot axis in clockwise or counterclockwise directions; a slidable member mounted on said instrument body for vertical sliding movement, said slidable member being located between said pivot axis and the front end of said arm; a vertical detecting element mounted on said slidable member and disposed in opposing relationship to said arm so that said arm can contact said detecting element when said arm pivots about said pivot axis; spring means normally holding said slidable member in a position in which said detecting element is spaced from said arm; and a detecting switch adapted to be actuated when said arm is forcibly pivoted in response to rotation of said disc and said arm abuts against said detecting element and said slidable member is slid vertically against the urging of said spring, said detecting switch being connected in circuit with said motor so that actuation of said detecting switch stops operation of said motor.

* * * * *

UNITED STATES PATENT AND TRADEMARK OFFICE
CERTIFICATE OF CORRECTION

PATENT NO.   :   4 389 786
DATED        :   June 28, 1983
INVENTOR(S)  :   Hideo Sakata et al It is certified that error appears in the above-identified patent and that said Letters Patent is hereby corrected as shown below:

Column 9, line 2; change "claim 1" to ---claim 2---.

Signed and Sealed this

Eighteenth Day of October 1983

[SEAL]

Attest:

GERALD J. MOSSINGHOFF

Attesting Officer

Commissioner of Patents and Trademarks